United States Patent
Nonaka

(10) Patent No.: US 7,278,744 B2
(45) Date of Patent: Oct. 9, 2007

(54) PROJECTOR HAVING A PLURALITY OF PROJECTION MODES

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 324 days.

(21) Appl. No.: 11/013,653

(22) Filed: Dec. 16, 2004

(65) Prior Publication Data

US 2005/0151936 A1   Jul. 14, 2005

(30) Foreign Application Priority Data

Jan. 13, 2004   (JP) .............................. 2004-005498

(51) Int. Cl.
G03B 21/00   (2006.01)
G03B 21/14   (2006.01)
G03B 21/26   (2006.01)
H04N 5/64   (2006.01)

(52) U.S. Cl. ........................... 353/31; 353/34; 353/69; 353/84; 353/94; 348/744

(58) Field of Classification Search .................. 353/31, 353/34, 69, 84, 94, 121, 122; 348/742, 743, 348/744

See application file for complete search history.

(56) References Cited

U.S. PATENT DOCUMENTS 7,052,138 B2 *   5/2006   Matsui ........................ 353/31

FOREIGN PATENT DOCUMENTS

| JP | 2002-014315 | 1/2002 |
| JP | 2002-040558 | 2/2002 |
| JP | 2002-182128 | 6/2002 |
| JP | 2002-268010 | 9/2002 |

* cited by examiner

Primary Examiner—Melissa Jan Koval
(74) Attorney, Agent, or Firm—Straub and Pokotylo; John C. Pokotylo

(57) ABSTRACT

A projector which projects an image on a projection plane includes a projection mechanism having a first projection mode in which the image is projected on the projection plane by giving priority to color reproducibility and a second projection mode in which the image is projected on the projection plane by giving priority to brightness. The projector also includes a central processing unit. The central processing unit has a determination unit which determines a type of the image, a selection unit which selects one of the first projection mode and the second projection mode based on a determination result of the determination unit, and a control unit which controls the projection mechanism in accordance with one of the first projection mode and the second projection mode selected by the selection unit.

11 Claims, 6 Drawing Sheets

PROJECTOR HAVING A PLURALITY OF PROJECTION MODES

CROSS-REFERENCE TO RELATED APPLICATIONS

This application is based upon and claims the benefit of priority from prior Japanese Patent Application No. 2004-005498, filed Jan. 13, 2004, the entire contents of which are incorporated herein by reference.

BACKGROUND OF THE INVENTION

1. Field of the Invention

The present invention relates to an improvement of a projector which projects a digital image on a projection plane.

2. Description of the Related Art

Conventionally, a projector for presentation has widely been used which can project meeting materials and the like on a screen to present them to a number of members of a meeting. Recently, as digital cameras and cellular phones with a camera become widespread, a number of people have been able to enjoy digital images generated from the cameras and phones by enlarging them by a projector. What is required for the projector is to improve the images in quality including color reproducibility rather than enlarge them more than necessary and to prevent the presence from reducing though the images are formed more largely than those on a small monitor attached to a camera or the like.

In the near future, there are two types of images to be reproduced by projectors: one is an image that requires color reproducibility, and the other is an image that gives higher priority to brightness.

For example, Jpn. Pat. Appln. KOKAI Publication No. 2002-40558 discloses a method of enhancing color reproducibility using a spatial modulation element and a diffraction grating color filter. Jpn. Pat. Appln. KOKAI Publication No. 2002-268010 discloses a method of enhancing color reproducibility using a color filter member such as a color wheel. Jpn. Pat. Appln. KOKAI Publication No. 2002-182128 discloses a method of enhancing color reproducibility by improving the structure of a color wheel.

BRIEF SUMMARY OF THE INVENTION

According to a first aspect of the present invention, there is provided a projector which projects an image on a projection plane, comprising a projection mechanism having a first projection mode in which the image is projected on the projection plane by giving priority to color reproducibility and a second projection mode in which the image is projected on the projection plane by giving priority to brightness, and a central processing unit including a determination unit which determines a type of the image, a selection unit which selects one of the first projection mode and the second projection mode based on a determination result of the determination unit, and a control unit which controls the projection mechanism in accordance with one of the first projection mode and the second projection mode selected by the selection unit.

According to a second aspect of the present invention, there is provided a projector which projects an image on a projection plane, comprising determination means for determining at least one of a state of the image and an ambient condition, and control means for selecting one of a first projection mode in which priority is given to color reproducibility of the image and a second projection mode in which priority is given to brightness of the image in accordance with a determination result of the determination means.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.

Figure 1:
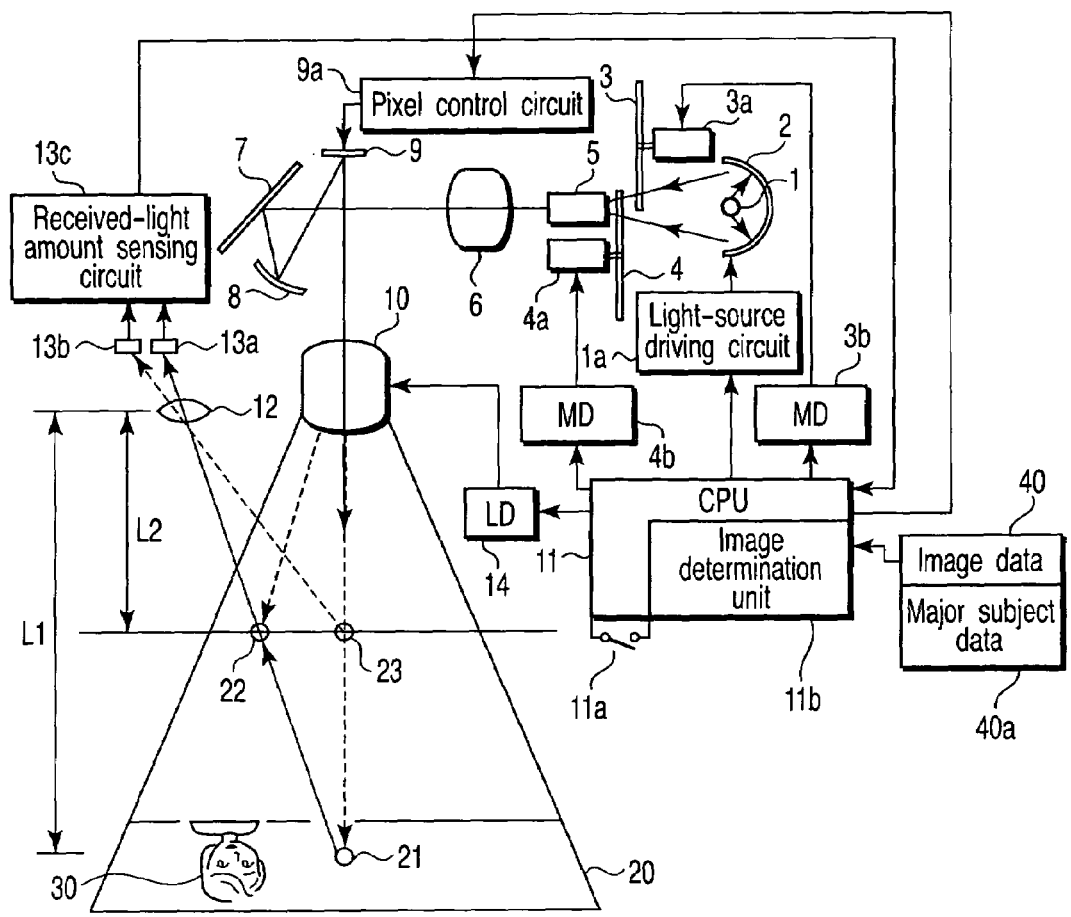
FIG. 1 is a block diagram showing a configuration of a projector according to an embodiment of the present invention.

FIG. 1 is a block diagram showing a configuration of a projector according to the embodiment of the present invention. The projector includes a projection mechanism. Referring to FIG. 1, the projector includes a light-source lamp 1 that is a white light source to project an image 30 on a projection plane 20. The light-source lamp 1 is driven by a light-source driving circuit 1a. The projector also includes an elliptic light-condensing mirror 2. The mirror 2 is provided close to the light-source lamp 1 to elliptically condense light from the light-source lamp 1. The projector also includes rotary color wheels 3 and 4 and a light guide 5 in the light-condensing direction of the mirror 2.

Figure 2:
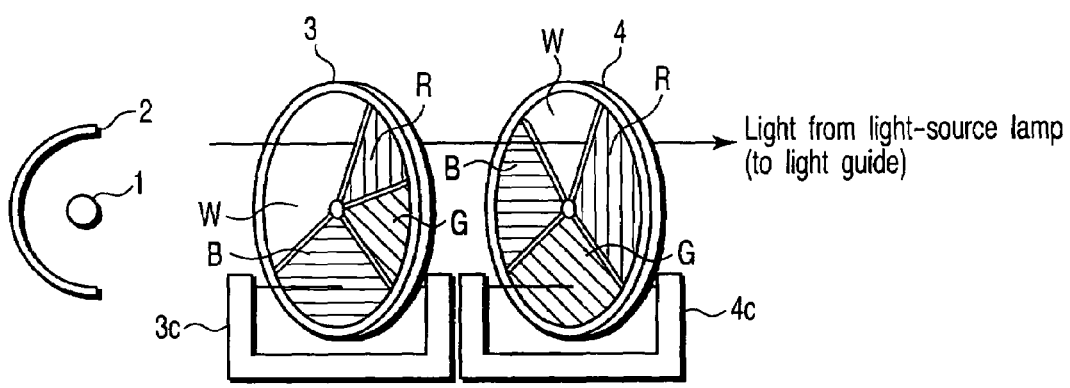
FIG. 2 is a detailed illustration of a configuration of color wheels.

The light emitted from the light-source lamp 1 is condensed by the elliptic light-condensing mirror 2 and transmitted to the light guide 5 through the color wheels 3 and 4. The color wheels 3 and 4 each have a plurality of color filter sections (three primary colors of RGB and transparent color of W) as shown in FIG. 2. The color wheels 3 and 4 differ in the area ratio of the color filter sections and, in other words, the ratio of the transparent section in the color wheel 3 is greater than that in the color wheel 4.

In the above configuration, when the light emitted from the light-source lamp 1 passes through the color filter sections of the color wheels 3 and 4, the color filter sections absorb light having a specific frequency one of white light components. Color is therefore added to the light. The color wheels 3 and 4 can be rotated by their respective motors 3a and 4a and transmit only one of light beams of R, G, B and W with certain timing. Since, however, colors are added to the light at high speed, a viewer can view an image that is colored exactly. Photocouplers 3c and 4c can sense what color filter section of the color wheels 3 and 4 transmits light, as illustrated in FIG. 2.

The projector according to the embodiment of the present invention has a first projection mode in which an image can be projected by giving priority to color reproducibility and a second projection mode in which an image can be projected by giving priority to brightness. One of the projection modes is selected by controlling the color wheels 3 and 4 appropriately. This selection will be described in detail later.

The light that has passed through the color wheels 3 and 4 is converted into light having a plane whose light amount (brightness) is uniform in the light guide 5. The light output from the light guide 5 enters a mirror 7 through a condenser lens 6. The light is reflected by the mirror 7 and enters a mirror 8. The light is reflected by the mirror 8 and enters a digital mirror device (DMD) 9. The DMD 9 forms an image 30.

The DMD 9 includes a plurality of pixels. The pixels have a group of very small mirrors. The mirrors are controlled by a pixel control circuit 9a and configured to direct the light emitted from the light-source lamp 1 toward a projection lens 10 and deflect it in a direction different from that of the projection lens 10. The pixel control circuit 9a is controlled by a central processing unit (CPU) 11 such as a microcomputer in accordance with digital image data 40. The CPU 11 serves as a control means and has an operating switch section 11a. If a viewer of an image operates the operating switch section 11a, the CPU 11 performs various types of control in accordance with the operating states of the operating switch section 11a.

The CPU 11 also controls motor drivers (MD) 3b and 4b that control the rotation speeds of the motors 3a and 4a and the like. The light and shade of a given color can thus be controlled according to how many times the very small mirrors of the DMD 9 are directed toward the projection lens 10 when light passes through the color filter sections of the color wheels. If the number of times of emission of light toward the projection lens 10 within a given very short time increases, the color becomes deep (light). If the number of times of deflection of light in the direction different from that of the projection lens 10 increases, the color becomes pale (dark).

The projector according to the embodiment of the present invention has a light-receiving lens 12 and sensors 13a and 13b for an autofocus operation. The CPU 11 senses an amount of light incident on the sensors 13a and 13b in response to the signal output from a received-light amount sensing circuit 13c. Based on the sensed amount of light, the CPU 11 controls the focal point of the projection lens 10 through a lens drive (LD) circuit 14. The operations of the sensors 13a and 13b can be performed by a sensor that receives signals from a remote control for remotely controlling the projector.

In the embodiment described above, the light-receiving lens 12, sensors 13a and 13b and received-light amount sensing circuit 13c can be used to determine whether the distance from the projector to the projection plane 20 such as a screen or a wall surface is long or short. The optimum image can be projected in accordance with the determined distance. If the distance is long, the projection of an image that gives priority to color reproducibility will probably make the entire screen dark and, in this case, an image that gives priority to brightness should be projected.

A method of determining whether the distance is long or short will be described in more detail. In FIG. 1, the received-light amount sensing circuit 13c senses an amount of reflected signal light that is incident on the sensor 13a, and a selection signal of a projection mode corresponding to the sensed amount of light is supplied to the CPU 11. The CPU 11 determines whether the distance is long or short in response to the selection signal. When the projection plane 20 is irradiated with signal light other than image light for image projection, if the CPU 11 determines that a selection signal corresponding to the signal light reflected by the projection plane 20 is a signal corresponding to the point indicated by reference numeral 21, the distance is a long distance $L_1$. On the other hand, if the CPU 11 determines that the selection signal corresponds to the point indicated by reference numeral 22, the distance is a short distance $L_2$. It is preferable that the sensors each have a distance-measuring projection light source. Furthermore, the CPU 11 can sense which of the sensors 13a and 13b the signal light reflected by the points 21 and 23 enters. If the signal light enters the sensor 13a, the distance is long ($L_1$). If it enters the sensor 13b, the distance is short ($L_2$). The middle distance between the long and short distances $L_1$ and $L_2$ can be determined by the ratio of the amount of light incident on the sensor 13a to that of light incident on the sensor 13b. The distance longer than the distance $L_1$ can be determined according to whether the amount of reflected signal light incident on the sensors is reduced more than a given amount.

The switching between the first projection mode that gives priority to color reproducibility and the second projection mode that gives priority to brightness will be described. In the embodiment of the present invention, the color wheels 3 and 4 that differ in the area ratio of the color filter sections are used to project an image. In the color wheels shown in FIG. 2, the section W of the color wheel 3 is larger than that of the color wheel 4 in order to make light enter the section W of the color wheel when the light is transmitted from the light-source lamp 1 to the light guide 5. The color wheel 3 is one for projecting an image that gives priority to brightness, while the color wheel 4 is one for projecting an image that gives priority to color reproducibility. If the color wheel 3 is rotated and the color wheel 4 is stopped such that light passes through the section W of the color wheel 4, the projector is set in the brightness-priority projection mode in which a large amount of light passes through the section W of the color wheel 3. On the other hand, if the color wheel 3 is stopped such that light passes through the section W of the color wheel 3 and the color wheel 4 is rotated to project an image, the projector is set in the color-reproducibility-priority mode in which the amount of light decreases but an image with a large amount of color information can be displayed.

Figure 3A:
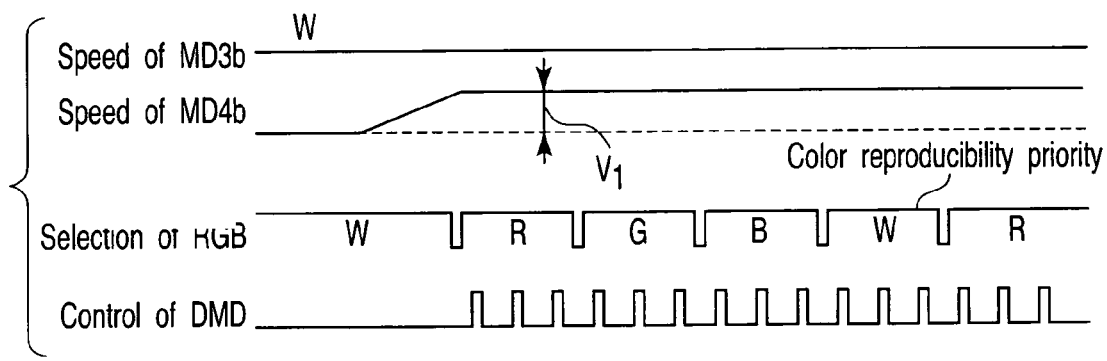
FIG. 3A is a timing chart showing an example of control of the color wheels in color-reproducibility-priority mode.

The switching between the color-reproducibility-priority projection mode and the brightness-priority projection mode using two different color wheels will be described in more detail with reference to the timing charts shown in FIGS. 3A and 3B. FIG. 3A is a timing chart of the color-reproducibility-priority projection mode and FIG. 3B is a timing chart of the brightness-priority projection mode.

In the color-reproducibility-priority projection mode shown in FIG. 3A, the color wheel 3 is stopped and only the color wheel 4 is rotated. The color wheel 3 is so controlled that light passes through the section W that is uncolored and thus prevented from being influenced by color. In FIG. 3B, too, the color wheel 4 that is stopped is so controlled that light passes through the section W.

Figure 3B:
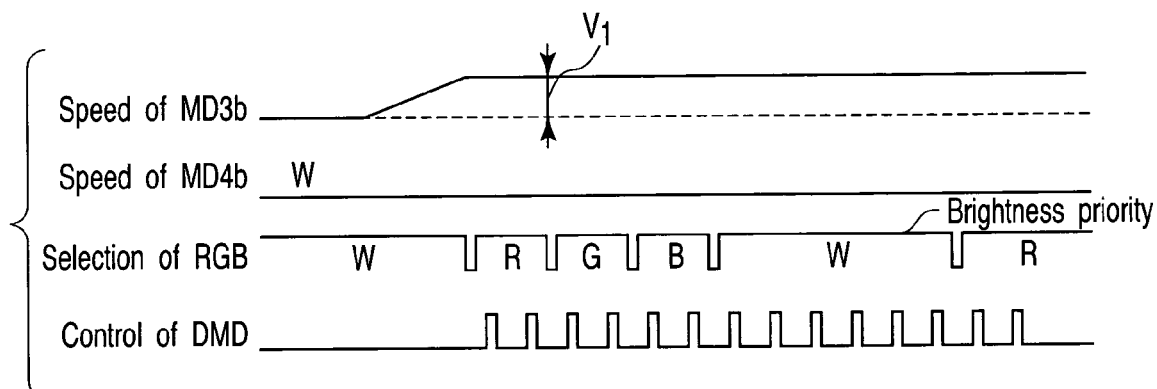
FIG. 3B is a timing chart showing an example of control of the color wheels in brightness-priority mode.

FIG. 3A shows that the MD4$b$ starts to control the motor 4$a$ at speed $V_1$, while FIG. 3B shows that the MD3$b$ starts to control the motor 3$a$ at speed $V_1$. The ratio of color filter sections of each color wheel is the same as that shown in FIG. 2. In FIG. 3A, therefore, the color filter sections of R, G and B and the section W appear at regular time intervals. In FIG. 3B, the section W appears more frequently. Since the control of the DMD 9 is performed at regular time intervals, it is understood that FIG. 3A is darker than FIG. 3B but the amount of color information is larger, or FIG. 3B is lighter than FIG. 3A but the amount of color information is smaller.

Figure 4:
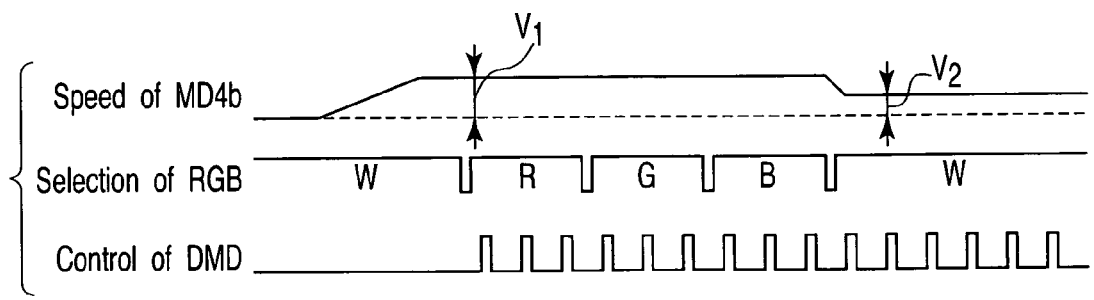
FIG. 4 is a timing chart showing another example of control of the color wheels in brightness-priority mode.

The above control requires two color wheels. Performing the control as shown in FIG. 4, however, the brightness-priority projection mode and the color-reproducibility-priority projection mode can be switched to each other without using the color wheel 3. In other words, the color wheel 3 is removed, and the speed of the remaining color wheel 4 is decreased from $V_1$ to $V_2$ in the section W. If the control of the DMD 9 is performed a large number of times while the speed of the color wheel 4 is low, priority can be given to brightness. If priority is given to color reproducibility, the control shown in FIG. 3A has only to be performed.

Figure 5A:
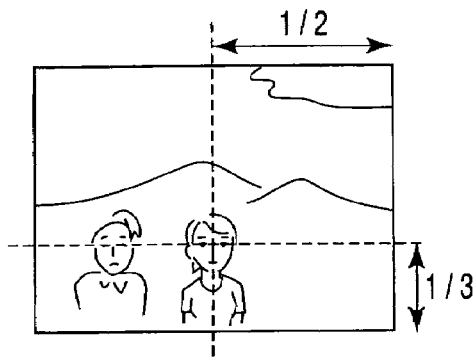
FIG. 5A is a diagram showing an example of a photo image.
Figure 5B:
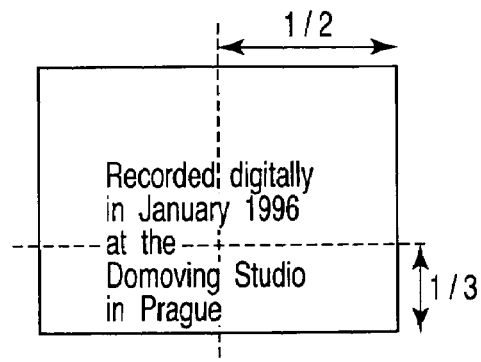
FIG. 5B is a diagram showing an example of an image of materials for presentation.

It is more favorable to select one of the color-reproducibility-priority projection and brightness-priority projection modes not only according to the distance to the projection plane 20 but also by determining whether an image to be projected is a photo image as shown in FIG. 5A which gives priority to color reproducibility or an image of materials for presentation as shown in FIG. 5B which gives priority to brightness.

Figure 8:
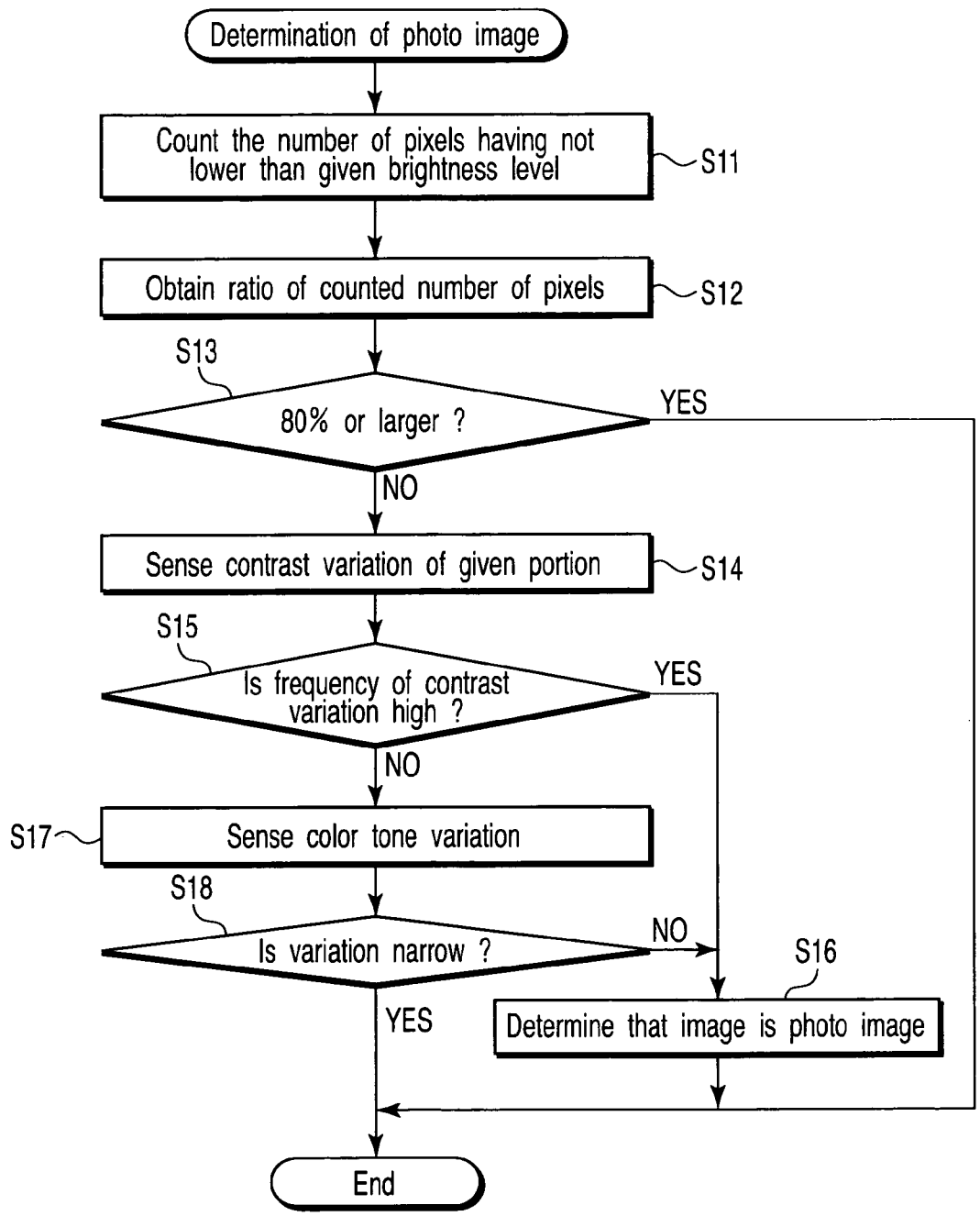
FIG. 8 is a flowchart showing an example of control to determine a photo image.

The type of an image to be projected is determined by the process shown in FIG. 8. More specifically, it is determined whether the image is a photo image or not and the color-reproducibility-priority projection mode is selected when the image is a photo image. This determination is performed by an image determination unit 11$b$ in the CPU 11. In FIG. 8, the control of the image determination unit 11$b$ will be described as that of the CPU 11.

The CPU 11 counts the number of pixels having not lower than a given brightness level (step S11) and obtains the ratio (distribution) of the counted number of the total number of pixels (step S12). Then, the CPU 11 determines whether the ratio obtained in step S12 is a given value (for example 80%) or larger (step S13). The value of 80% is one example and thus changeable.

Figure 6A:
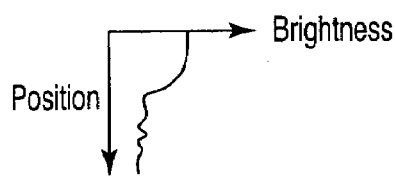
FIG. 6A is a chart of contrast variation of the middle portion of the image shown in FIG. 5A in the vertical direction.
Figure 6B:
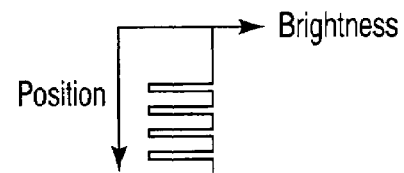
FIG. 6B is a chart of contrast variation of the middle portion of the image shown in FIG. 5B in the vertical direction.

When the CPU 11 determines that the ratio is the given value or larger in step S13, it determines that the image is one of materials for presentation and selects the brightness-priority projection mode. On the other hand, when the CPU 11 determines that the percentage is smaller than the given value in step S13, it senses the frequency of contrast variation in a given range (e.g., indicated by the broken lines in FIG. 5A or 5B) of a given portion of the image (step S14). Then, the CPU 11 determines whether the frequency of contrast variation is high or low (step S15). When the frequency is high in step S15, the CPU 11 determines that the image is a photo image and selects the color-reproducibility-priority projection mode (step S16). The reason for such a selection is as follows. The shade of the photo image shown in FIG. 5A changes little by little, or the frequency of contrast variation is high, whereas the amount of contrast variation of the image shown in FIG. 5B is large but the frequency thereof is low. FIG. 6A shows contrast variation of the middle portion (indicated by the vertical broken line) of the image shown in FIG. 5A in the vertical direction, and FIG. 6B shows contrast variation of the middle portion (indicated by the vertical broken line) of the image shown in FIG. 5B in the vertical direction. In FIG. 5A, the upper portion of the image is often sky and thus the contrast variation of a one-third lower portion of the image (indicated by the horizontal broken line) appears as shown in FIGS. 7A and 7B.

Figure 7A:
FIG. 7A is a chart of contrast variation of the lower portion of the image shown in FIG. 5A in the horizontal direction.
Figure 7B:
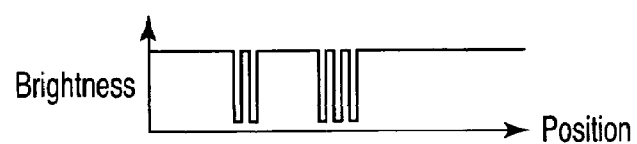
FIG. 7B is a chart of contrast variation of the lower portion of the image shown in FIG. 5B in the horizontal direction.

Referring to FIGS. 7A and 7B, the contrast of the photo image shown in FIG. 5A varies at frequencies which are higher than that of the image of materials for presentation shown in FIG. 5B. It is thus possible to determine that the image is a photo image based on the contrast variation. Needless to say, the type of the image can be determined by the peak of the contrast and the regularity thereof.

When the frequency is low in step S15, the CPU 11 senses the color tone variation of the image (step S17) and determines whether the variation is narrow or not (step S18). In FIG. 5B, most of the image is often occupied by the specific color tone such as a white background and a blue background and thus the color tone variation is considered to be narrow. Therefore, the CPU 11 executes step S18 to determine that the image is a photo image only when the color tone variation is wide and select the color-reproducibility-priority projection mode.

Using the above process, the type of an image can be determined based on the input image data 40. The image data 40 may have data 40$a$ on the major subject (hereinafter referred to as major subject data) to determine whether the image is a photo image. For example, the major subject data 40$a$ can be written as header information of image data.

Figure 9:
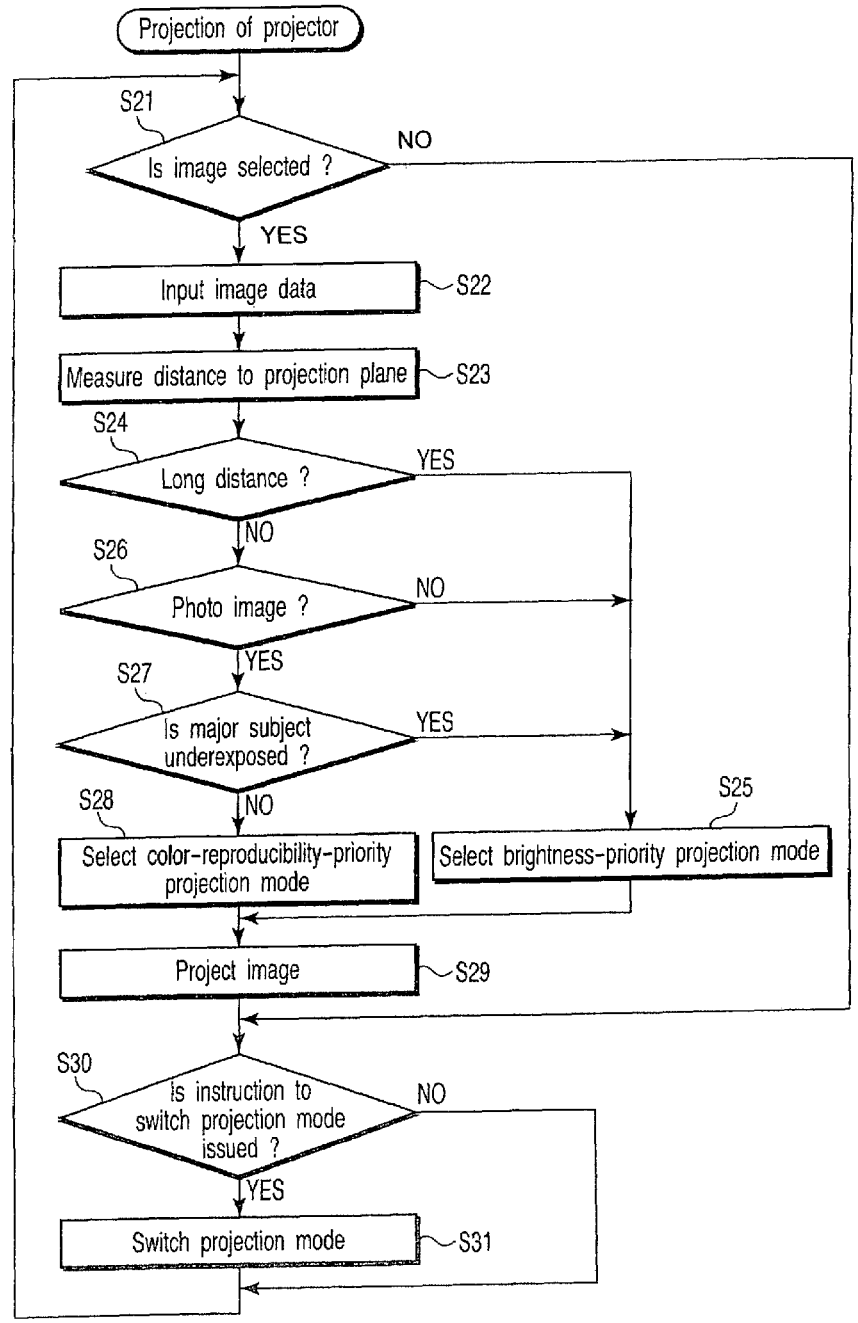
FIG. 9 is a flowchart showing an example of control performed when an image is projected by the projector according to the embodiment of the present invention.

If the CPU 11 performs the control in accordance with the flowchart shown in FIG. 9 in the configuration capable of determining the type of an image through the above process, the optimum image can be displayed in its corresponding projection mode.

First, the CPU 11 determines whether an image to be projected is selected or not (step S21). If the image is selected, its image data is input (step S22). This image data is used to determine the photo image as shown in FIG. 8 and decide how to control the DMD 9.

Next, the CPU 11 measures the distance to the projection plane 20 using the distance-measuring method of a light projecting type or a reflected-light receiving type (step S23) and determines whether the measured distance is long or not (step S24). When it is long, no light reaches the projection plane 20. The CPU 11 selects the brightness-priority projection mode (step S25) and moves to step S29.

When the distance is not long in step S24, the CPU 11 determines whether the image is a photo image as described with reference to FIG. 8 (step S26). If the image is not a photo image, the CPU 11 moves to step S25 and selects the brightness-priority projection mode using the color wheel 3. If the image is a photo image, the CPU 11 determines whether a portion of the major subject is underexposed more than the other portion (background) (step S27). This determination can be performed by storing information indicating that the major subject is underexposed in the major subject data 40a and reading it by the CPU 11. When the CPU 11 determines that the major subject is extremely underexposed in step S27, it moves to step S25 to select the brightness-priority projection mode. The brightness-priority projection mode utilizes a tendency to overexpose a bright portion. In the brightness-priority projection mode, the background is overexposed to clarify the expression of the major subject.

When the major subject is not underexposed in step S27, the CPU 11 moves to step S28 to select the color-reproducibility-priority projection mode using the color wheel 4 (step S28).

After one of the projection modes is selected as described above, the image is projected (step S29). Since the projection modes are switched to each other in synchronization with the selection of an image, even though the color tone of the image varies during the projection, a viewer does not feel it to be unnatural. When the viewer depresses a switch to change the projection mode, the CPU 11 senses it (step S30) to select the other projection mode (step S31).

Figure 10:
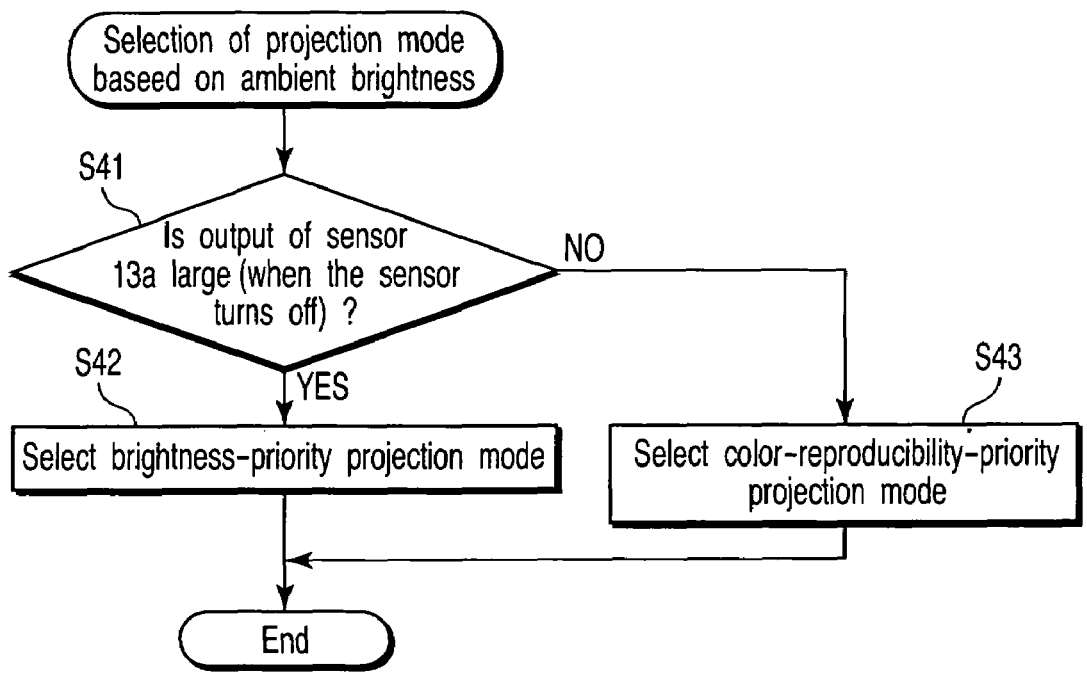
FIG. 10 is a flowchart showing an example of selection of a projection mode.

The ambient brightness of an image can be sensed using the sensor 13a described above to select a projection mode. If the image is bright without any projection of the projector, it is hard to view and thus the brightness-priority projection mode is selected. This selection is carried out in accordance with the flowchart shown in FIG. 10. More specifically, the CPU 11 determines whether the output of the sensor 13a that turns off is larger than a given amount (step S41). If it is larger, the brightness-priority projection mode is selected (step S42). If it is not larger, the color-reproducibility-priority projection mode is selected (step S43).

Figure 11A:
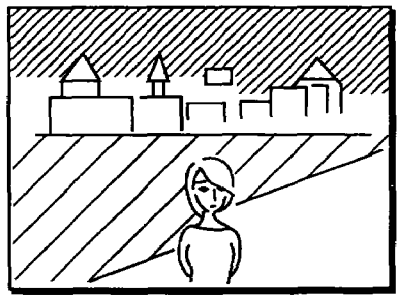
FIG. 11A is a diagram showing an example of a night scene.
Figure 11B:
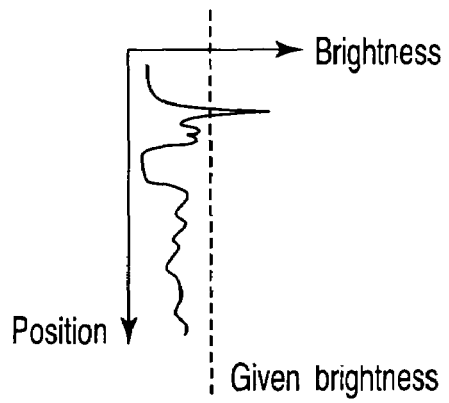
FIG. 11B is a chart of brightness variation in the night scene.

With the determination as described above, an image can be projected under optimum conditions. For example, vivid colors of red and yellow leaves of autumn, a blue sky and the like can be displayed in the color-reproducibility-priority projection mode. A night scene as shown in FIG. 11A is provided as one whose color reproducibility should be considered to be significant. If the brightness of the entire image is lower than a given level and the image includes some bright portions as shown in FIG. 11B, the image can be determined as a night scene. In the night scene, the color-reproducibility-priority projection mode is selected.

As described above, according to the embodiment of the present invention, the color-reproducibility-priority projection mode and brightness-priority projection mode can be switched to each other only under control of the motors. Consequently, the number of color wheels can be reduced to downsize the projector and simplify the configuration of the projector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projector which projects an image on a projection plane, comprising:
   a projection mechanism having a first projection mode in which the image is projected on the projection plane by giving priority to color reproducibility and a second projection mode in which the image is projected on the projection plane by giving priority to brightness; and
   a central processing unit including:
   (a) a determination unit which determines whether the image is a photo image;
   (b) a selection unit which selects the first projection mode when the determination unit determines that the image a photo image and selects the second projection mode when the determination unit determines that the image is not a photo image; and
   (c) a control unit which controls the projection mechanism in accordance with one of the first projection mode and the second projection mode selected by the selection unit.

2. The projector according to claim 1, wherein the determination unit determines whether the image is a photo image based on any one of distribution of brightness of the image, contrast variation of the image, and color tone variation of the image.

3. The projector according to claim 1, wherein the determination unit measures a distance to the projection plane to determine the type of the image, and the selection unit selects the second projection mode when the determination unit determines that the distance to the projection plane is long.

4. The projector according to claim 1, wherein the determination unit senses ambient brightness of the image to determine the type of the image, and the selection unit selects the second projection mode when the determination unit determines that the ambient brightness is high.

5. The projector according to claim 1, wherein the selection unit selects one of the first projection mode and the second projection mode in synchronization with a change in the image projected by the projection mechanism.

6. The projector according to claim 1, wherein the projection mechanism includes a plurality of color wheels to change color of the image.

7. The projector according to claim 1, wherein the projection mechanism includes a plurality of rotary color wheels and changes color of the image by switching a rotation speed of the plurality of rotary color wheels.

8. The projector according to claim 1, wherein the determination unit compares brightness of a major subject of the image and brightness of a background to determine the type of the image, and the selection unit selects the second projection mode when the major subject is dark relative to the background.

9. A projector which projects on an image on a projection plane, comprising:
   a determination unit which determines at least one of a state of the image and an ambient condition; and
   a control unit which selects one of a first projection mode in which priority is given to color reproducibility of the image and a second projection mode in which priority is given to brightness of the image in accordance with a determination result of the determination unit,
   wherein the determination unit includes distance-measuring unit which measures a distance to the projection plane, and the control unit selects one of the first projection mode and the second projection mode in accordance with a measurement result of the distance-measuring unit.

10. The projector according to claim 9, further comprising a plurality of color wheels to change color of the image in accordance with a selection of the control unit.

11. The projector according to claim 9, which the projector further comprises a plurality of rotary color wheels, and the control unit switches a rotation speed of the plurality of rotary color wheels to change the color of the image.

* * * * *